United States Patent [19]
Frankenhauser

[11] 3,780,325
[45] Dec. 18, 1973

[54] APPARATUS FOR LOCKING STATOR WINDING CONDUCTORS OF TURBOGENERATORS IN POSITION

[75] Inventor: Georg Frankenhauser, Mulheim/Ruhr, Germany

[73] Assignee: Kraftwerk Union Aktiengesellschaft, Mulheim/Ruhn, Germany

[22] Filed: June 12, 1972

[21] Appl. No.: 261,652

[30] Foreign Application Priority Data
June 18, 1971 Germany.................. P 21 30 201.2

[52] U.S. Cl. .............................................. 310/214
[51] Int. Cl. ................................................ H02k 3/48
[58] Field of Search................... 310/192, 194, 213, 310/214, 215, 217, 218, 128

[56] References Cited
UNITED STATES PATENTS

| | | | |
|---|---|---|---|
| 3,444,407 | 5/1969 | Yates | 310/215 |
| 1,010,998 | 12/1911 | Williamson | 310/214 |
| 1,555,065 | 9/1925 | Lindquist | 310/214 |
| 2,922,058 | 1/1960 | Bacon | 310/214 |
| 2,821,641 | 1/1958 | Ringland | 310/213 |
| 3,391,294 | 7/1968 | Moxie | 310/214 |
| 3,009,073 | 11/1961 | Drabik | 310/214 |

*Primary Examiner*—R. Skudy
*Attorney*—Herbert L. Lerner et al.

[57] ABSTRACT

Apparatus for locking the stator winding conductors of turbogenerators in position comprises inserts between the upper and lower conductor bars. The inserts are supplemental retaining wedges and associated leaf springs and intermediate components. The supplemental retaining wedges, the leaf springs and the intermediate components are positioned in a radial interspace between the supplemental retaining wedges and the upper surface of the lower bar. This exerts a radial retaining pressure on the lower bar, regardless of the upper bar, and further results in a reduction of the pulsating pressure stress of the bars and permits wider limits for the lowest feasible number of slots.

3 Claims, 1 Drawing Figure

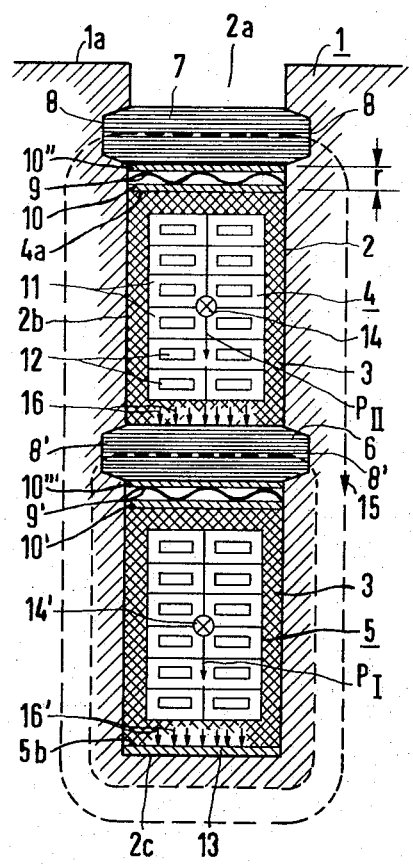

APPARATUS FOR LOCKING STATOR WINDING CONDUCTORS OF TURBOGENERATORS IN POSITION

The present invention relates to apparatus for locking stator winding conductors of electrical machines in position. More particularly, the invention relates to apparatus for locking stator winding conductors of turbogenerators in position.

A turbogenerator of the type utilizing the apparatus of the invention comprises upper and lower bars positioned in the slot of the stack of stator laminations. Each of the upper and lower bars is provided with a sleeve of insulating material, bar separators positioned between the upper and lower bars, and retaining wedges positioned in the area of the opening of the slot at a radial distance relative to the upper bar, which may be inserted into lateral recesses in the sides of the slot.

Apparatus of the aforedescribed type is disclosed in a textbook by H. Meyer, entitled "The The insulation of Large Electrical Machines," Springer Verlag, 1962, page 82, FIG. 62. In such apparatus, the upper and lower conductor bars are separated from each other by bar separators and are locked jointly in the slot by the retaining wedge, which is also the slot closing wedge. This apparatus is applicable to medium generator rating. Thermal stress, however, causes the original firm seating of the conductor bars in their slot to be loosened in the course of time to a greater or lesser degree due to settling and shrinkage. In the presence of large current forces, the play of the conductor bars in their slots would thus lead within a short time to the destruction of the conductor assembly and the insulation.

The aforedescribed undesirable phenomena may be countered by the utilization of resilient components having suitable spring characteristics, so that even after extended operation, sufficient bias or pressure is retained between the bottom of the slot and the bar. This is disclosed in German Published Patent Application Nos. 1,463,872 and 1,613,236. In German Published Patent Application No. 1,613,236, corrugated, wavy or bent leaf springs of titanium alloy are inserted between the slot closing wedge and the upper surface of the upper bar. The leaf springs are corrugated, wavy or undulating in the longitudinal direction of the conductor bar. In accordance with German Published Patent Application No. 1,463,872, leaf springs which are similarly corrugated, wavy, undulating or bent in the longitudinal direction of the conductor bar are inserted between the slot closing wedge and the upper surface of the upper bar and intermediate components are also inserted. Provision is also made of retensioning the leaf springs by pit plugs threaded into the slot closing wedge which act on the nodes of the springs.

The known apparatus needs further improvement, since the conductor forces and the remaining pretension act in the same direction, which is the direction toward the bottom of the slot, if the currents in the conductors flow in the same direction. This may lead, particularly in the case of high bar currents, where there are a low number of slots, to a considerable pulsating pressure stress in the conductor assembly and the insulation. The aforedescribed high pulsating pressure stresses have an effect particularly in the area of the bottom of the slot, and it is very difficult in practice to reduce said stresses by slot bottom strips.

An object of the invention is to provide apparatus for locking stator winding conductors of turbogenerators in position, which apparatus eliminates the high pulsating pressure stresses in the conductor assembly and the insulation.

Another object of the invention is to provide apparatus for locking stator winding conductors of turbogenerators in position, which apparatus restricts the high pulsating pressure stress on the lower conductor bar to permissible limits even when high bar currents flow.

Still another object of the invention is to provide apparatus for locking stator winding conductors of turbogenerators in position, which apparatus includes leaf springs and intermediate components inserted between the retaining wedges and the upper bar for exerting radial retaining pressure on the upper bar.

In accordance with the invention, apparatus for locking stator winding conductors of turbogenerators in position comprises separators comprising supplemental retaining wedges having associated leaf springs and intermediate components positioned between the upper and lower bars. The supplemental retaining wedges and the associated leaf springs and intermediate components are positioned in a radial space between the supplemental retaining wedges and the upper surface of the lower bar and exert a radial retaining pressure on the lower conductor bar independently of the upper conductor bar. The resultant separate wedging or locking of the upper and lower conductor bars compensates for the amount of settling due to two springs. The charactersitcs or pretension of the springs may be matched to the respective conductor forces. This prevents the forces of the upper bar from acting additively on the lower bar and results in a reduction of the pulsating pressure stress.

In the apparatus of the invention, including leaf springs, corrugated, wavy or undulating in the longitudinal or transverse directions of the bar, and filler strips provided below and, optionally, above the leaf springs as intermediate components in the area of the upper retaining wedge, it is particularly advantageous if springs undulating in the longitudinal or transverse directions of the bars having filler strips therebelow and, optionally, thereabove, are provided in the radial space between the supplemental retaining wedge and the upper surface of the lower bar.

In order that the invention may be readily carried into effect, it will now be described with reference to the accompanying drawing, wherein the single FIGURE is a cross-sectional view of the apparatus of the invention for locking stator winding conductors of turbogenerators in position inserted in an axially extending slot of the stack of stator laminations of a turbogenerator.

In the FIGURE, an electrical machine such as, for example, a turbogenerator, has a stack of stator laminations 1 provided at the inner periphery of a bore 1a with a plurality of radially and axially extending slots, of which one slot 2 is shown. An upper collector bar 4, surrounded by a sleeve of insulating material 3, is inserted in the slot 2. A lower conductor bar 5, also surrounded by the sleeve of insulating material 3, is also inserted in the slot 2. The upper bar 4 is also known as the "hole bar" and the lower bar 5 is also known as the "back bar."

A bar separator 6 is provided between the upper bar 4 and the lower bar 5. The bar separators 6 comprises insulating material. A retaining wedge 7, also known as a slot closing wedge, is inserted in the area of the slot opening 2a at a radial distance r relative to the upper bar 4. The retaining wedge 7 is inserted in axially extending recesses 8 of the sides 2b of the slot 2. The retaining wedge 7 comprises a plurality of axially aligned retaining wedge sections.

The recesses 8 are formed in the sides 2b of the slot 2 in a manner whereby the retaining wedge 7 can brace itself against said sides in radial directions and can exert radial contact pressure on the upper bar 4, a leaf spring 9 and an intermediate component 10. The leaf spring 9 and the intermediate component 10 are inserted between the retaining wedge 7 and the upper surface 4a of the upper bar 4. The leaf spring 9 is corrugated, undulating, wavy or bent in directions transverse to the conductor bar 4. The retaining wedge 7 is forced into position under the tension of the leaf spring 9, and therefore exerts, via said leaf spring, contact pressure on the upper bar 4 which is substantially maintained, even when there are specific settling phenomena of the insulating sleeve 3 and/or the retaining wedge 7.

The intermediate component 10 functions to uniformly distribute the contact pressure to the upper surface 4a of the upper bar 4. Another intermediate component 10'' may also be provided on the upper surface of the leaf spring 9, between said leaf spring and the retaining wedge 7. The upper bar 4 and the lower bar 5 particularly comprise Roebel bars having individual conductors 11 provided with cooling channels 12 for liquid cooling of said conductors. Insulation (not shown in the FIGURE) is provided for the individual conductors, between said conductors.

A slot bottom component 13 comprising insulating material is provided between the under surface 5b of the lower bar 5 and the bottom 2c of the slot 2. The bar separator 6 between the upper bar 4 and the lower bar 5 is a supplemental retaining wedge and is inserted axially, similarly to the retaining cell 7, in axially or longitudinally extending recesses 8' in the sides 2b of the slot 2. The supplemental retaining wedge or bar separator 6 exerts a radial retaining pressure on the lower bar 5 via another leaf spring 9' and another intermediate component 10'. Still another intermediate component 10''' may be provided on the upper surface of the leaf spring 9', between said leaf spring and the retaining wedge 6. The radial retaining pressure exerted by the supplemental retaining wedge 6 is practically independent of the radial forces applied to the upper bar 4.

The radial forces applied to, or acting on, the upper bar 4 comprise the radial retaining forces produced by the retaining wedge 7 and the current forces. It may be assumed that the direction of current flow for the upper bar 4 is indicated by an arrow 14 and the direction of current flow for the lower bar 5 is indicated by an arrow 14'. Electromagnetic forces $P_I$ then act on the upper bar 4 and electromagnetic forces $P_{II}$ act on the lower bar 5. Since the bar current flows through both bars 4 and 5 in the same direction, the current forces between said bars are mutually attracting. A magnetic field 15 is linked with both bars 4 and 5 and produces a resultant radial pressure force in a direction toward the bottom 2c of the slot 2 for both bars. The magnetic field 15 must therefore be taken into consideration. As indicated by force arrows 16 and 16', the supplemental retaining wedge 6, however, absorbs the forces on the upper bar 4. Thus, only the forces 16' acting on the lower part of the bar assembly are effective at the bottom 2c of the slot 2 at the under surface 5b of the lower bar 5.

The leaf springs 9 and 9' may be corrugated, undulating, wavy or bent in longitudinal directions. An additional filler component (not shown in the FIGURE) may be provided at the upper surface of the leaf spring 9' to facilitate the axial forcing into position of the supplemental retaining wedge 6, as in the case of the upper bar 4.

In the usual manner, the individual conductors 11 comprise copper and the bar insulation 3 comprises several layers of epoxy-saturated mica tape. The retaining wedges 6 and 7 comprise glass fiber reinforced epoxy resin with little shrinkage. The leaf springs 9 and 9' comprise glass fiber reinforced epoxy molded components. The intermediate components 10 and 10' comprise suitable insulating plastic material.

While the invention has been described by means of a specific example and in a specific embodiment, it should not be limited thereto, for obvious modifications will occur to those skilled in the art without departing from the spirit and scope of the invention.

It is claimed:

1. Apparatus for locking stator winding conductors of a turbogenerator in position, the turbogenerator having a stack of stator laminations having a plurality of slots formed therein each having lateral recesses formed in its sides in the area of the opening of the slot, the stator winding conductors comprising a plurality of upper bars and lower bars, an upper bar and a lower bar of which are inserted in each of the slots, a sleeve of insulating material around the upper and lower bars in each slot, a bar separator in each slot between the upper bar and the lower bar, a retaining wedge in the area of the slot opening of each slot radially spaced from the upper bar and inserted in the lateral recesses in the sides of each slot, a leaf spring and intermediate component in each slot between the retaining wedge and the upper bar for exerting radial retaining pressure on the upper bar, said apparatus comprising a supplemental retaining wedge comprising the bar separator in each slot between the upper and lower bars, and an addtioinal leaf spring in each slot and an additional intermediate component in each slot inserted in a radial space between the supplemental retaining wedge and the upper surface of the lower bar, the supplemental retaining wedge, the additional leaf spring and the additional intermediate component in each slot exerting inward radial retaining pressure on the lower bar in the direction of the slot base independently of the upper bar.

2. Apparatus for locking stator winding conductors of a turbogenerator in position as claimed in claim 1, wherein the leaf spring in each slot is corrugated in one of a direction longitudinal and transverse to the bars, the additional leaf spring in each slot is corrugated in one of a direction longitudinal and transverse to the bars, the intermediate component is positioned below the leaf spring as a separator in the area of the retaining wedge, and the additional intermediate component is positioned below the additional leaf spring.

3. Apparatus for locking stator winding conductors of a turbogenerator in position as claimed in claim 2, further comprising a third intermediate component positioned above the leaf spring as a separator in the area of the retaining wedge and a fourth intermediate component positioned above the additional leaf spring in the radial space between the supplemental retaining wedge and the upper surface of the lower bar.

* * * * *